US012802351B2

(12) United States Patent
Boeder et al.

(10) Patent No.: US 12,802,351 B2
(45) Date of Patent: Nov. 17, 2026

(54) METHOD FOR TRAINING A MACHINE LEARNING MODEL TO GENERATE A VOXEL-BASED 3D REPRESENTATION OF AN ENVIRONMENT OF A VEHICLE

(71) Applicant: Robert Bosch GmbH, Stuttgart (DE)

(72) Inventors: Simon Boeder, Hannover (DE); Fabian Gigengack, Hemmingen (DE); Oliver Lange, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 18/779,331

(22) Filed: Jul. 22, 2024

(65) Prior Publication Data

US 2025/0046013 A1 Feb. 6, 2025

(30) Foreign Application Priority Data

Aug. 4, 2023 (DE) ..................... 10 2023 207 525.3

(51) Int. Cl.
*G06T 17/00* (2006.01)
*G06V 10/44* (2022.01)
*G06V 10/56* (2022.01)
*G06V 20/56* (2022.01)

(52) U.S. Cl.
CPC .............. *G06T 17/00* (2013.01); *G06V 10/44* (2022.01); *G06V 10/56* (2022.01); *G06V 20/56* (2022.01)

(58) Field of Classification Search
CPC G06T 17/00; G06T 15/08; G06T 7/73; G06T 17/20; G06T 2207/20081; G06T 2207/20084; G06T 2207/30252; G06V 10/44; G06V 10/56; G06V 20/56; G06V 10/7753; G06V 10/82; G06V 20/64; G06N 3/0895
See application file for complete search history.

(56) References Cited

U.S. PATENT DOCUMENTS

2023/0070475 A1* 3/2023 Horstmeyer ........... G02B 21/18
2023/0222748 A1 7/2023 El Beheiry et al.

OTHER PUBLICATIONS

Yi Wei, et al., "SurroundOcc: Multi-Camera 3D Occupancy Prediction for Autonomous Driving", published in IEEE International Conference on Computer Vision, Mar. 16, 2023 (Year: 2023).*

* cited by examiner

*Primary Examiner* — Chong Wu
(74) *Attorney, Agent, or Firm* — NORTON ROSE FULBRIGHT US LLP

(57) ABSTRACT

A method for training an ML model to generate a voxel-based 3D representation of an environment of a vehicle. The method includes: generating first image data, which represent the environment of the vehicle, based on at least one data source; extracting at least one image feature from the first image data using the trainable ML model; generating a voxel-based 3D representation for the environment using the trainable ML model by transforming the at least one image feature into a corresponding voxel feature, wherein each voxel feature contains occupancy information and color information of a 3D position of the voxel feature; rendering the generated 3D representation for the at least one voxel feature based on the color information and the occupancy information to generate second image data; comparing the first input image data with the generated second out image data, and adjusting at least one parameter of the ML model.

6 Claims, 3 Drawing Sheets

METHOD FOR TRAINING A MACHINE LEARNING MODEL TO GENERATE A VOXEL-BASED 3D REPRESENTATION OF AN ENVIRONMENT OF A VEHICLE

FIELD

The present invention relates to a method for training a machine learning model to generate a voxel-based 3D representation of an environment of a vehicle.

BACKGROUND INFORMATION

Today's methods in the related art for 2D or 3D object recognition generally use so-called machine learning models (ML models), which are trained on the basis of known objects, such as vehicles, pedestrians or traffic signs, identified in the existing data. Such methods require a large amount of existing, annotated image data in order to train the neural network to a corresponding quality.

However, this approach is inadequate for the application area of autonomous driving. This is because an autonomously driving vehicle must be able to recognize any object with which it could potentially collide, within a 360-degree radius surrounding the vehicle. Such problems are solved by means of so-called generic object detection. Some conventional solutions for generic object detection have so far often pursued the approach of obtaining information about the depth and degree of movement for objects in an environment of the vehicle by fusing stereo and temporal information. However, this approach is only applicable to a single image or to image pairs in a 2D domain and often implies the application of traditional computer-vision-based techniques, which have very low performance in comparison to techniques based on machine learning models.

A more advanced approach to generic object recognition is based on the use of so-called 3D voxel networks (=machine learning models), which may also be referred to as 3D occupancy networks, which predict an occupancy. These 3D voxel networks are based on assigning an occupancy to each voxel in a 3D grid (=representation in which the predictions of the network are stored), i.e., whether or not the voxel is occupied by an object in the real world. U.S. Patent Application Publication No. US 2023/222748 A1 describes, by way of example, an application of a voxel-based 3D grid for recognizing objects around a vehicle.

However, the use of 3D voxel networks has so far always required a large amount of data to train a neural network and obtain correspondingly reliable object recognitions. This effort is expensive and time-consuming.

It is an object of the present invention to provide a solution by means of which a machine learning model, such as a 3D occupancy network, can be trained in an efficient and cost-effective manner in order to generate a voxel-based 3D representation of an environment of a vehicle.

SUMMARY

This object may be achieved by a method for training a machine learning (ML) model to generate a voxel-based 3D representation of an environment of a vehicle with certain features of the present invention.

According to a first aspect, the present invention relates to a method for training a machine learning (ML) model to generate a voxel-based 3D representation of an environment of a vehicle.

According to an example embodiment of the present invention, in a first step, first image data, which represent the environment of the vehicle, are generated on the basis of at least one data source.

In a second step, at least one image feature is extracted from the first image data with the aid of the trainable ML model.

In a third step, a voxel-based 3D representation for the environment of the vehicle is generated with the aid of the trainable ML model by transforming the at least one image feature in the 2D domain into a corresponding voxel feature in a 3D domain, wherein each voxel feature contains information about an occupancy and color information of a 3D position of the voxel feature.

In a fourth step, the generated 3D representation for the at least one voxel feature is rendered on the basis of the color information and the information about the occupancy in order to generate second image data. For this purpose, both the predicted color information and predicted occupancy probabilities are used.

In a fifth step, the first input image data are compared with the generated second output image data and, if a deviation is determined, at least one parameter of the ML model is adjusted in a sixth step, the at least one parameter being the weight of the ML model, in order to minimize the ascertained deviation and thus train the ML model and thus improve the generated 3D representation of the ML model.

A feature of the present invention is that a voxel-based 3D representation for the environment of the vehicle is generated by means of the trainable ML model, wherein each generated voxel feature in the 3D domain that corresponds to an image feature in the 2D domain contains occupancy information and color information of a 3D position of the voxel feature.

By comparing first input image data with the second generated output image data on the basis of the generated 3D representation for a voxel feature, a deviation between input image data and output image data is detected by means of a loss function, which contributes to a continuous improvement of the ML model used.

Another important aspect of the present invention is also that the present invention is suitable for efficiently combining efficient data handling through so-called self-supervision of so-called neural radiance fields (=NeRFs), or volumetric rendering, with a 3D object representation of occupancy networks.

The present invention can therefore achieve the following advantages in an efficient and cost-effective manner, without requiring a large amount of training data for training a neural network:

- Generic object recognition instead of class-specific object recognition on the basis of labeled or annotated training data.
- Performing so-called self-supervision, i.e., the independent efficient training of the neural network taking data efficiency into account.
- The neural network model to be trained can be fed with new input data at any time (long-term learning), without the use of the usual annotation and labeling techniques or so-called ground truth calculations for the collected data.
- Generating improved and more accurate predictions through more contentful volumetric 3D representations.
- Improvement of high-resolution and fine-grained occupancy information.

The ML model can be variably scaled to different applications and areas of use (e.g., for autonomous driving of technical devices or vehicles, environmental observations, etc.).

Better prediction results of the ML model.

In one possible embodiment of the method of the present invention, the ML model is trained with additional training data from a lidar data source. Lidar data can be used to create a rough estimate of the actual occupancy of the voxels in order to facilitate the training process of the ML model. The data from the lidar data source are converted into a voxel-based representation, e.g., voxel grids, which are then used as training data. This achieves the advantage that the ML model can be trained more simply and better, so that an exact 3D object representation of the environment of the vehicle can be generated efficiently.

In one possible embodiment of the method of the present invention, the step of rendering is implemented as differentiable volumetric rendering. This achieves the advantage that the deviation between the first input image data and the second output image data can be used to improve the ML model and thus to improve the generated 3D representation.

One possible embodiment of the method of the present invention provides that the step of generating a voxel-based 3D representation uses temporal information by the at least one voxel feature being extended by an aggregation of at least one further voxel feature from at least one previous point in time. This achieves the advantage that an improved 3D object representation Substitute Specification of the environment of the vehicle can be generated on the basis of the ML model improved in this way, since the ML model obtains additional temporal information.

According to a second aspect, the present invention relates to a computer program containing machine-readable instructions which, when executed on one or more computers and/or compute instances, cause the computer(s) or compute instance(s) to perform the method according to the present invention.

According to a third aspect, the present invention relates to a machine-readable data carrier and/or download product comprising the computer program.

According to a fourth aspect, the present invention relates to one or more computers and/or compute instances comprising the computer program and/or comprising the machine-readable data carrier and/or the download product.

Further measures improving the present invention are explained in more detail below, together with the description of the preferred exemplary embodiments of the present invention, with reference to figures.

DETAILED DESCRIPTION OF EXAMPLE EMBODIMENTS

Figure 1:
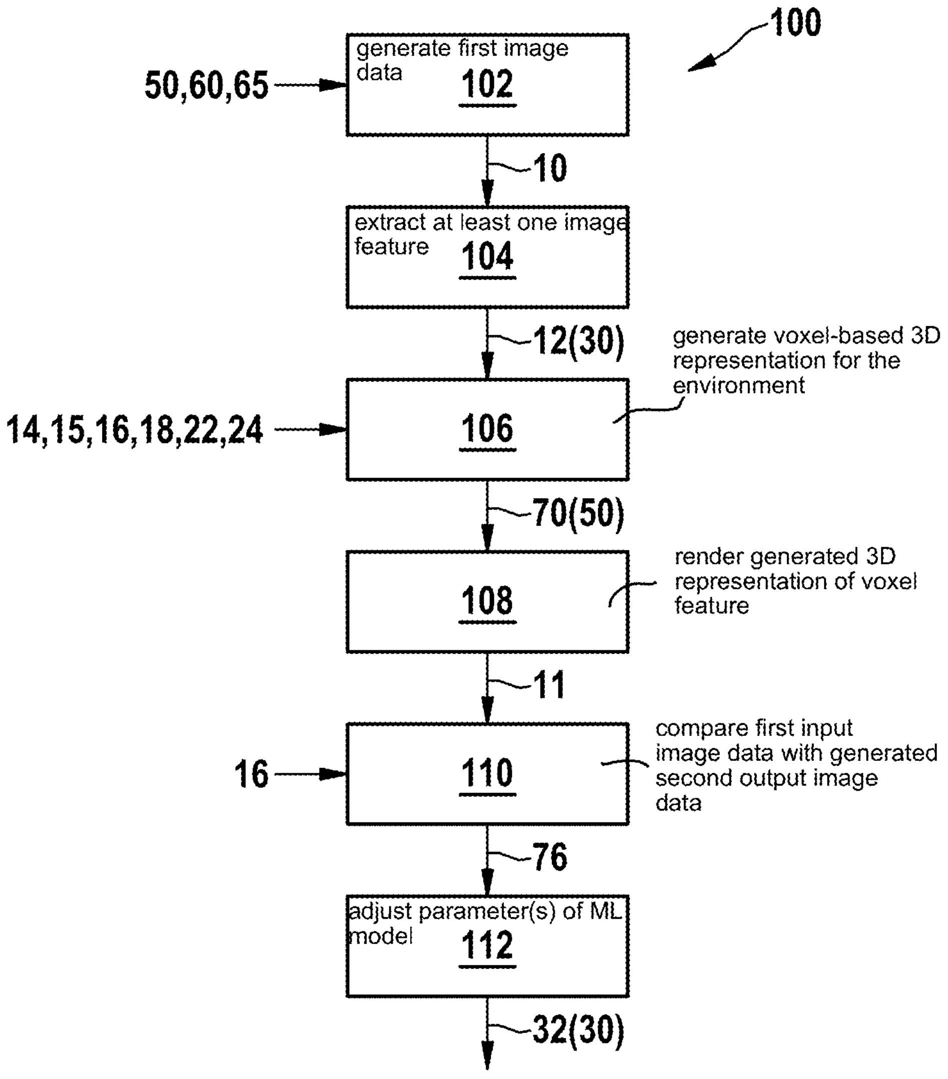
FIG. 1 is a schematic flow diagram of the method 100 for training a machine learning (ML) model 30 to generate a voxel-based 3D representation of an environment 50 of a vehicle 60, according to an example embodiment of the present invention.

FIG. 1 shows a schematic flow diagram of the method 100 for training a machine learning (ML) model 30 to generate a voxel-based 3D representation of an environment 50 of a vehicle 60.

In step 102, first image data 10, which represent the environment 50 of the vehicle 60, are generated on the basis of at least one data source 65.

Figure 2:
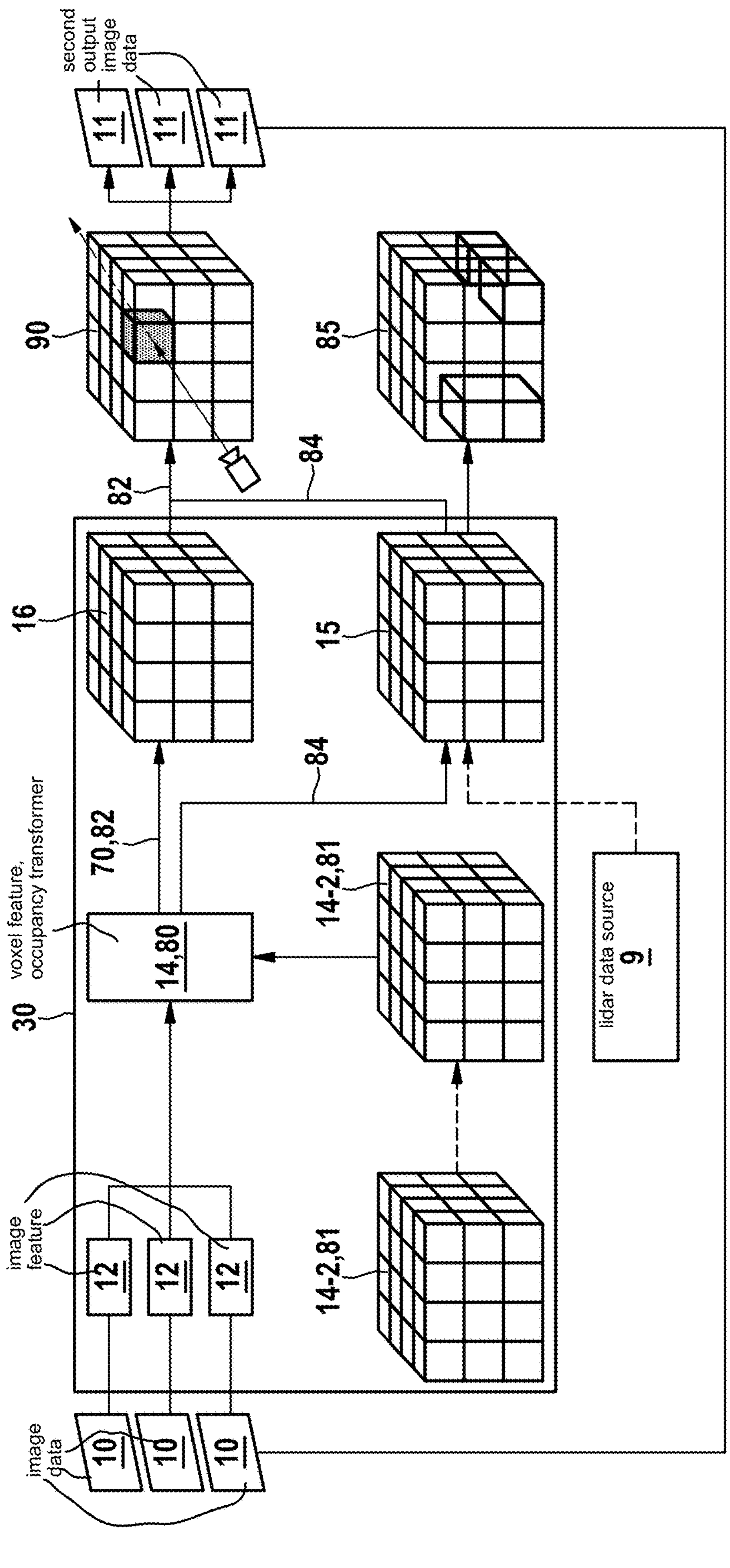
FIG. 2 is a schematic representation of a system architecture for performing the method 100 according to an example embodiment of the present invention.

Optionally, the ML model 30 can be trained with additional training data from a lidar data source 9 (see FIG. 2).

In step 104, at least one image feature 12 is extracted 104 from the first image data 10 with the aid of the trainable ML model 30.

In step 106, a voxel-based 3D representation 70 for the environment 50 of the vehicle 60 is generated by means of the occupancy transformer 80 (see FIG. 2) with the aid of the trainable ML model 30 by transforming the at least one image feature 12 in the 2D domain 22 into a corresponding voxel feature 14 in a 3D domain 24, wherein each voxel feature 14 contains information about an occupancy 15 and color information 16 of a 3D position 18 of the voxel feature 14.

Optionally, the step 106 of generating a voxel-based 3D representation 70 uses temporal information 81 (see also FIG. 2) in that the at least one voxel feature 14 is extended by an aggregation of at least one further voxel feature 14-2 from at least one previous point in time.

In step 108, the generated 3D representation 70 for the at least one voxel feature 14 is rendered on the basis of the predicted and ascertained color information 16 and the predicted and ascertained information about the occupancy 15 in order to generate second image data 11.

Optionally, the step 108 of rendering comprises differentiable volumetric rendering. It is important to mention that both the predicted occupancy probabilities 15 and the predicted color information 16 are used to generate the output image data 11. The color information 16 is thus only used during the rendering, i.e., during the training. The color information 16 is no longer required during the generic object detection 130 (see FIG. 3), since this object detection only uses the occupancy probabilities 15.

In step 110, the first input image data 10 are compared with the generated second output image data 11 and, if a deviation 76 is determined, at least one parameter 32 of the ML model 30 is adjusted in step 112 in order to minimize the ascertained deviation 76 and thus train the ML model and thus improve the generated 3D representation 70 of the ML model 30. In this context, it should be mentioned that the comparison of the first input image data 10 with the generated second output image data 11 can preferably take place using differentiable volumetric rendering.

FIG. 2 shows (in combination with FIG. 1) a schematic representation of a system architecture for performing the method 100 according to an embodiment of the present invention.

On the basis of first image data 10, which represent the environment 50 of the vehicle 60, from at least one data source 65, at least one image feature 12 is extracted from the first image data 10 with the aid of the trainable ML model 30, which contains an occupancy transformer 80.

The occupancy transformer 80 then generates a voxel-based 3D representation 70 for the environment 50 of the vehicle 60 (see FIG. 1) with the aid of the trainable ML model 30. In this case, the at least one image feature 12 in the 2D domain 22 is transformed into a corresponding voxel feature 14 in a 3D domain 24. Each voxel feature 14 contains information about an occupancy 15, which can be additionally enriched with data from a lidar source 9, and color information 16 of a 3D position 18 of the voxel feature 14.

Temporal information 81 for voxels 14 or voxel features 14-2 generated at an earlier point in time can be fed in aggregated form into the occupancy transformer 80.

FIG. 2 furthermore shows two paths, a first signal path 82, which is only used when training the model 30, and a second signal path 84, which is used for interference and training of the model 30.

The rendering engine 90 renders the generated 3D representation 70 of the occupancy transformer 80 for the at least one voxel feature 14 in order to generate second image data 11.

Figure 3:
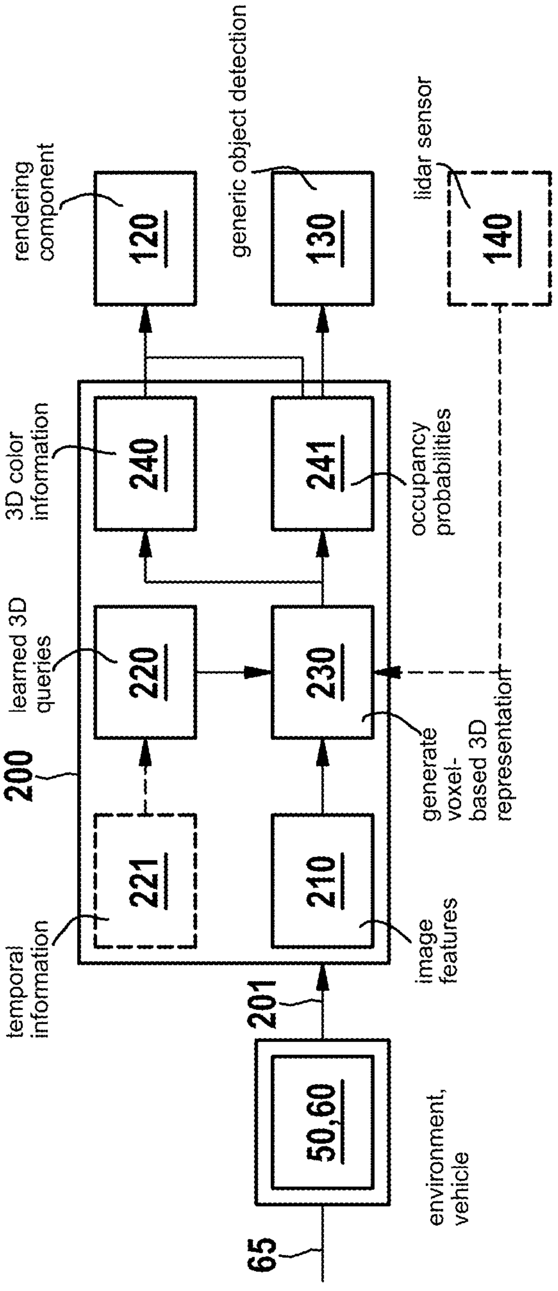
FIG. 3 is a schematic representation of a signal flow plan for performing the method 100 according to an example embodiment of the present invention.

The first input image data 10 are subsequently compared with the generated second image data 11. If a deviation 76 is determined between the input image data 10 and the output image data 11 generated by the renderer 90, at least one parameter 32 of the ML model 30 is adjusted in order to minimize the ascertained deviation 76. In this way, the ML model 30 is trained and the generated 3D representation 70 of the ML model 30 is improved. FIG. 3 shows a schematic representation of a signal flow plan for performing the method 100 with an occupancy network 200 according to an embodiment of the present invention.

The occupancy networks in the related art were initially used for a 3D representation of individual objects. Modeling entire scenes or an environment of a vehicle by using occupancy networks is also described in the related art. However, for this purpose, large amounts of three-dimensional training data have had to be generated and used so far in order to train such networks.

The present invention makes these large amounts of training data for training an occupancy network superfluous, since only image data 10 from an environment 50 of the vehicle 60 from at least one data source 65 are sufficient to train and improve the ML model 30 in a manner as shown clearly and by way of example in FIG. 2.

Input image data 10 (see FIG. 2), which are or were recorded at a defined point in time, are provided as input 201 to the proposed model by preferably a plurality of cameras. The occupancy network 200 first extracts corresponding image features 210 therefrom.

The features can be extracted separately for each image.

In block 230, the occupancy transformer 80 (see also FIG. 3) generates a voxel-based 3D representation 70 for the environment 50 of the vehicle 60 with the aid of the trainable ML model 30, wherein each voxel feature 14 contains information about an occupancy 15, or an occupancy probability, and color information 16 of a 3D position 18 of the voxel feature 14.

The ascertained occupancy probability, which represents the final result of the proposed ML model 30, is supplied (see also FIG. 2) for use in a corresponding downstream task 130, 85, such as for 3D object recognition.

During the training of the ML model 30, the 3D occupancy probabilities 241 are fed together with the 3D color information 240 for each voxel into a rendering component 120 in order to reconstruct the input image data 10, 201 therefrom.

Subsequently, the 3D positions of all learned 3D queries 220 are fed into the occupancy transformer 80 (see FIG. 3), where these learned 3D queries 220 interact with the image features 210 with the aid of the occupancy transformer 230. The resulting and generated values are then stored in the 3D voxel grid and represent a probability 241 of occupancy for each voxel. The model 30 provides, as output, with the color information 240 and the occupancy information 241 for each voxel, information about a probability with which a voxel in question is occupied in the defined 3D grid.

The first input image data 10 are subsequently compared with the generated second output image data 11 and, if a deviation 76 is determined, the output image data 11 are fed back to the input of the network by using a suitable loss function. By adjusting at least one parameter 32 of the ML model 30, the ascertained deviation 76 is minimized and the ML model is thus improved or trained. In this way, the generated 3D representation 70 of the ML model 30 is successively improved.

Optionally, temporal information 221 can be incorporated into the prediction results of the ML model 30 by appropriate aggregation before generating the corresponding voxel-based 3D representation for the environment 50 of the vehicle 50.

Furthermore, a lidar sensor 140 can be used to explicitly monitor and train the occupancy predictions.

On the basis of the input data 201, the environment 50 around the vehicle 60 is thus modeled by means of a 3D voxel grid. Each voxel in this 3D voxel grid contains the information as to whether or not this voxel is occupied by a real object.

On the basis of input data 201, which originate from a data source 65 of a vehicle 60 that senses the environment 50 thereof, a feature extraction 210 takes place first, the result of which is supplied to an occupancy transformer 230. With the ML model trained in this way, the generated predictions for occupancy states of the individual voxels can be used for a variety of different tasks (see module 130 of FIG. 3), in particular for generic 3D object detection.

In order to increase the accuracy of the trained ML model, the following steps may optionally be performed (see FIG. 3):

By introducing a temporal aggregation 221 of the predicted occupancy states (occupancy predictions), earlier points in time can be taken into account and moving objects can be recognized and detected over a defined time progression.

Further sensor data, for example from lidar point clouds, can be easily integrated in order to provide greater stability to a supervision of the ML model (see module 140 in FIG. 3).

The invention claimed is:

1. A method for training a machine learning (ML) model to generate a voxel-based three-dimensional (3D) representation of an environment of a vehicle, comprising the following steps:

generating first image data, which represent the environment of the vehicle, based on at least one data source;

extracting at least one image feature from the first image data using the ML model;

generating a voxel-based 3D representation for the environment of the vehicle using the ML model by transforming the at least one image feature in a two-dimensional (2D) domain into a corresponding voxel feature in a 3D domain, wherein each voxel feature contains information about an occupancy and color information of a 3D position of the voxel feature;

rendering the generated 3D representation for the at least one voxel feature based on the color information and the information about the occupancy to generate second image data;

comparing the first input image data with the generated second output image data; and based on determining a deviation between the first input image data and the second output image data, adjusting at least one parameter of the ML model to minimize the ascertained deviation and thus train the ML model and thus improve the generated 3D representation generated by using the ML model.

2. The method according to claim 1, wherein the ML model is trained with additional training data from a lidar data source.

3. The method according to claim 1, wherein the step of rendering is implemented as differentiable volumetric rendering.

4. The method according to claim 1, wherein the step of generating the voxel-based 3D representation uses temporal information by the at least one voxel feature being extended by an aggregation of at least one further voxel feature from at least one previous point in time.

5. A non-transitory machine-readable data carrier on which is stored a computer program including machine-readable instructions for training a machine learning (ML) model to generate a voxel-based three-dimensional (3D) representation of an environment of a vehicle, the instructions, when executed by one or more computers and/or compute instances, causing the one or more computers and/or compute instances to perform the following steps:

generating first image data, which represent the environment of the vehicle, based on at least one data source;

extracting at least one image feature from the first image data using the ML model;

generating a voxel-based 3D representation for at least one voxel feature for the environment of the vehicle using the ML model by transforming the at least one image feature in a two-dimensional (2D) domain into a corresponding voxel feature in a 3D domain, wherein each voxel feature contains information about an occupancy and color information of a 3D position of the voxel feature;

rendering the generated 3D representation for the at least one voxel feature based on the color information and the information about the occupancy to generate second image data;

comparing the first input image data with the generated second output image data; and based on determining a deviation between the first input image data and the second output image data, adjusting at least one parameter of the ML model to minimize the ascertained deviation and thus train the ML model and thus improve the generated 3D representation generated by using the ML model.

6. One or more computers and/or compute instances equipped with a non-transitory machine-readable data carrier on which is stored a computer program including machine-readable instructions for training a machine learning (ML) model to generate a voxel-based three-dimensional (3D) representation of an environment of a vehicle, the instructions, when executed by the one or more computers and/or compute instances, causing the one or more computers and/or compute instances to perform the following steps:

generating first image data, which represent the environment of the vehicle, based on at least one data source;

extracting at least one image feature from the first image data using the ML model;

generating a voxel-based 3D representation for at least one voxel feature for the environment of the vehicle using the ML model by transforming the at least one image feature in a two-dimensional (2D) domain into a corresponding voxel feature in a 3D domain, wherein each voxel feature contains information about an occupancy and color information of a 3D position of the voxel feature;

rendering the generated 3D representation for the at least one voxel feature based on the color information and the information about the occupancy to generate second image data;

comparing the first input image data with the generated second output image data; and based on determining a deviation between the first input image data and the second output image data, adjusting at least one parameter of the ML model to minimize the ascertained deviation and thus train the ML model and thus improve the generated 3D representation generated by using the ML model.

* * * * *